United States Patent
Li et al.

(10) Patent No.: US 12,557,564 B2
(45) Date of Patent: Feb. 17, 2026

(54) MEMORY CELL WITH A VARIABLE ELEMENT AND A PHASE CHANGE MEMORY

(71) Applicant: INTERNATIONAL BUSINESS MACHINES CORPORATION, Armonk, NY (US)

(72) Inventors: Ning Li, White Plains, NY (US); Andrew Herbert Simon, Fishkill, NY (US); Injo Ok, Albany, NY (US); Kangguo Cheng, Schenectady, NY (US); Timothy Mathew Philip, Albany, NY (US); Kevin W. Brew, Niskayuna, NY (US); Jin Ping Han, Yorktown Heights, NY (US); Juntao Li, Cohoes, NY (US); Nicole Saulnier, Slingerlands, NY (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 18/146,344

(22) Filed: Dec. 23, 2022

(65) Prior Publication Data

US 2024/0215462 A1 Jun. 27, 2024

(51) Int. Cl.
*H10N 70/00* (2023.01)
*G11C 13/00* (2006.01)
*H10B 63/00* (2023.01)
*H10N 70/20* (2023.01)

(52) U.S. Cl.
CPC ....... *H10N 70/841* (2023.02); *G11C 13/0004* (2013.01); *G11C 13/003* (2013.01); *H10B 63/30* (2023.02); *H10N 70/011* (2023.02); *H10N 70/231* (2023.02)

(58) Field of Classification Search
CPC .................................................... H10N 70/841
See application file for complete search history.

(56) References Cited

U.S. PATENT DOCUMENTS

| 6,850,432 | B2 | 2/2005 | Lu et al. |
| 8,717,804 | B2 | 5/2014 | Toda |
| 9,070,478 | B2 | 6/2015 | Cho et al. |
| 2009/0189136 | A1* | 7/2009 | Matsuzaki ......... H10N 70/8828 257/E21.409 |
| 2013/0016557 | A1 | 1/2013 | Kim |

(Continued)

FOREIGN PATENT DOCUMENTS

| CN | 103165179 B | 12/2015 |
| CN | 108520765 B | 8/2020 |

(Continued)

OTHER PUBLICATIONS

Ning, J. et al., "Low Energy Switching of p-Phase Change Materials Using a 2D Thermal Boundary Layer", arXiv:2202.04699v1 [physics.optics] (2022), 34 pgs.

(Continued)

*Primary Examiner* — Mounir S Amer
(74) *Attorney, Agent, or Firm* — Yuanmin Cai (57) ABSTRACT

An electrical device includes a first electrode in series with a second electrode. A phase change memory (PCM) is in series with the second electrode. A variable electrical element is in series with the phase change memory.

18 Claims, 6 Drawing Sheets

(56) References Cited

U.S. PATENT DOCUMENTS

| 2014/0376149 | A1* | 12/2014 | Lamorey | H01G 7/00 29/25.42 |
|---|---|---|---|---|
| 2021/0151505 | A1* | 5/2021 | Han | H10N 50/01 |
| 2021/0184113 | A1* | 6/2021 | Li | H10N 70/011 |

FOREIGN PATENT DOCUMENTS

| KR | 20050031733 A | 4/2005 |
|---|---|---|
| KR | 100695682 B1 | 3/2007 |

OTHER PUBLICATIONS

Anh, C. et al., "Energy-Efficient Phase-Change Memory with Graphene as a Thermal Barrier", NANO Letters (2015), vol. 15, pp. 6809-6814.

Rao, F. et al., "Programming Voltage Reduction in Phase Change Memory Cells with Tungsten Trioxide Bottom Heating Layer/Electrode", Nanotechnology (2008), vol. 19, 6 pgs.

* cited by examiner

MEMORY CELL WITH A VARIABLE ELEMENT AND A PHASE CHANGE MEMORY

BACKGROUND

Technical Field

The present application generally relates to computer memory, and more particularly to a phase change memory device in conjunction with other electrical elements.

Description of the Related Art

A phase change material (PCM) is a material that can be switched from one phase to another. Based on the properties of the different phases, PCMs have been explored for their use in various computational schemes. Namely, a PCM provides a relatively high resistance when it is in an amorphous phase, and a relatively low resistance when it is in a crystalline phase.

A phase change memory cell is programmed by applying a pulse of sufficient strength to alter the phase of the phase change material inside. This is typically achieved by applying an electrical pulse through the phase change material. Due to ohmic heating, the phase change material changes its phase. A relatively high intensity, short duration current pulse with a quick transition at the trailing edge results in the phase change material melting and cooling quickly. The phase change material does not have the time to form organized crystals, thereby creating an amorphous solid phase. A relatively low intensity, long duration pulse allows the phase change material to heat and slowly cool, thus crystallizing into the crystalline phase. It is possible to adjust the intensity and duration of the pulses to produce a varying degree of resistance for multi-bit storage in a memory cell.

A phase change memory cell is read by applying a pulse of insufficient strength to program, i.e., to alter the phase of the material. The resistance of this pulse can then be read as a "1" or "0". The amorphous phase, which carries a greater resistance, is generally used to represent a binary 0. The crystalline phase, which carries a lower resistance, can be used to represent a binary 1. In cells where there are varying degrees of resistance, the phases can be used to represent, for example, "00", "01", "10", and "11."

Accordingly, there is a need to enhance and sustain proper functioning of a phase change memory cell by stabilizing and/or controlling resistance, current and voltage in relation to the device containing the phase change memory cell.

SUMMARY

According to an embodiment of the present disclosure, an electrical device is provided. The electrical device includes a first electrode in series with a second electrode, a phase change memory in series with the second electrode, and a variable electrical element in series with the phase change memory. The electrical device can be a memory cell. The present electrical device can increase device stability and endurance, while also providing greater versatility in relation to one or more programable voltages and currents associated with the device.

In an embodiment that can be combined with the previous embodiment, the variable electrical element is a variable resistor or a tunneling diode, In an embodiment that can be combined with the previous embodiments, the variable electrical element includes at least one oxide layer.

In an embodiment that can be combined with the previous embodiments, the at least one oxide layer can include at least one of i) tantalum-oxide or ii) tungsten-oxide.

In an embodiment that can be combined with the previous embodiment, the device can further include at least one transistor in series with the phase change material.

In an embodiment that can be combined with the previous embodiments, the first electrode is a bottom electrode in direct contact with the at least one oxide layer. The first electrode is in direct contact with the phase change material.

In an embodiment that can be combined with the previous embodiments, the at least one oxide layer can be a confined layer of the bottom electrode.

In an embodiment that can be combined with the previous embodiments, the at least one oxide layer can be a blanket layer associated with the bottom electrode.

In an embodiment that can be combined with the previous embodiments, the device further includes one or more metal interconnects in direct contact with the at least one oxide layer.

In an embodiment that can be combined with the previous embodiments, the first electrode is a top electrode, and the at least one oxide layer is associated with the top electrode.

In an embodiment that can be combined with the previous embodiments, the second electrode is a bottom electrode with at least one intermediary layer in between the bottom electrode and the at least one oxide layer.

In an embodiment that can be combined with previous embodiments, the phase change memory, one or more metal interconnects are in direct contact with the bottom electrode.

In an embodiment that can be combined with the previous embodiments, the bottom electrode is in direct contact with the phase change memory.

According to another embodiment, an electrical device includes a phase change memory (PCM) in direct contact with both a first electrode and a layer with one or more metal interconnects. A variable electrical element in direct contact with the PCM and in series with the PCM.

In an embodiment that can be combined with the previous embodiment, the electrical device can be a memory cell.

In an embodiment that can be combined with the previous embodiments, the variable element can be either a tunneling diode or a variable resistor.

In an embodiment that can be combined with the previous embodiments, the variable element can include at least one oxide layer.

In an embodiment that can be combined with the previous embodiments, the oxide layer includes at least one i) tantalum-oxide or ii) tungsten-oxide.

In an embodiment that can be combined with the previous embodiments, the electrical device includes: at least one transistor in series with the PCM, In an embodiment that can be combined with the previous embodiments, the at least one oxide layer is contained in the layer with one or more metal interconnects.

In an embodiment that can be combined with the previous embodiments, the at least one oxide layer is contained in the first electrode.

According to another embodiment, a method for forming one or more electrical devices includes providing a layer with one or more metal interconnects. An insulator layer is provided over the layer with the one or more metal interconnects, forming a first electrode in the insulator layer and in direct contact with at least one metal interconnect of the layer with the one or more metal interconnects. A phase change memory (PCM) is provided over the first electrode and in direct contact with the first electrode. A second electrode is provided over the PCM and in direct contact with the PCM. An oxidation layer is formed in direct contact with at least one of i) at least one of the first and the second electrode and ii) the PCM. The PCM and the oxidation layer are in series. By virtue of the method discussed herein, device endurance is improved and SET resistance is stabilized.

In an embodiment that can be combined with the previous embodiment, the formation of the oxidation layer includes performing one or more i) etching and ii) oxidation operations in relation to the device.

In an embodiment that can be combined with the previous embodiments, the formed oxidation layer is between 3 nm and 5 nm. In one or more embodiments, this range offers a balance between power consumption during switching, without being too small to cause reliability and uniformity issues in general.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In one aspect, spatially related terminology such as "front," "back," "top," "bottom," "beneath," "below," "lower," "above," "upper," "side," "left," "right," and the like, is used with reference to the orientation of the Figures being described. Since components of embodiments of the disclosure can be positioned in a number of different orientations, the directional terminology is used for purposes of illustration and is in no way limiting. Thus, it will be understood that the spatially relative terminology is intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

As used herein, the terms "lateral" and "horizontal" describe an orientation parallel to a first surface of a chip.

As used herein, the term "vertical" describes an orientation that is arranged perpendicular to the first surface of a chip, chip carrier, or semiconductor body.

As used herein, the terms "connected," "coupled" and/or "electrically coupled" are not meant to mean that the elements must be directly coupled together—intervening elements may be provided between the "coupled" or "electrically coupled" elements. In contrast, if an element is referred to as being "directly connected" or "directly coupled" to another element, there are no intervening elements present. The term "electrically connected" refers to a low-ohmic electric connection between the elements electrically connected together.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

Example embodiments are described herein with reference to cross-sectional illustrations that are schematic illustrations of idealized or simplified embodiments (and intermediate structures). As such, variations from the shapes of the illustrations as a result, for example, of manufacturing techniques and/or tolerances, may be expected. Thus, the regions illustrated in the figures are schematic in nature and their shapes do not necessarily illustrate the actual shape of a region of a device and do not limit the scope.

It is to be understood that other embodiments may be used and structural or logical changes may be made without departing from the spirit and scope defined by the claims. The description of the embodiments is not limiting. In particular, elements of the embodiments described hereinafter may be combined with elements of different embodiments.

It is understood in advance that although example embodiments of the present disclosure are described in connection with a particular transistor architecture, embodiments of the present disclosure are not limited to the particular transistor architectures or materials described in this specification. Rather, embodiments of the present disclosure are capable of being implemented in conjunction with any other type of transistor architecture or materials now known or later developed.

For the sake of brevity, conventional techniques related to electrical device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that can be relevant to aspects of the present disclosure. For example, one or more embodiments relates to electrical devices, e.g., memory cells that include a phase change memory (PCM) in series with a variable electrical element, e.g., any suitable electrical device that can adjust current and/or voltage, for example a variable resistor or a tunneling diode. In one or more embodiments, the various device configurations contained herein, including those with one or more PCM devices in series with one or more variable elements, e.g., one or more tunneling diodes and/or variable resistors, provide for i) increasing and stabilizing the SET resistance, e.g., making it constant, associated with a memory cell device, ii) flexibility in adjusting the programmable voltage and associated current, e.g., reducing the former and increasing the latter, in relation to the memory cell device, iii) reduce leakage paths associated with the memory cell device and/or iv) improve overall device endurance and preventing device degradation.

Turning now to a more detailed description of fabrication operations and resulting structures according to aspects of the disclosure, FIGS. 1-5B depict various configurations for arranging an electrical device in accordance with the present disclosure, including an electrical device that includes various configurations of a series connection between a PCM and a variable element, such as a variable resistor and/or tunneling diode or other suitable element for regulating voltage and/or current.

Fabrication of the device associated with FIGS. 1-5B, e.g., devices or structures 100-500B, can comprise multistep sequences of, for example, photolithographic and/or chemical processing steps that facilitate gradual creation of electronic-based systems, devices, components, and/or circuits in a semiconducting and/or a superconducting device (e.g., an integrated circuit). For instance, device 101 can be fabricated on one or more substrates (e.g., a silicon (Si) substrate, and/or another substrate discussed in more detail below) by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, and/or another photoresist technique), etching techniques (e.g., reactive ion etching (RIE), dry etching, wet etching, ion beam etching, plasma etching, laser ablation, and/or another etching technique), evaporation techniques, sputtering techniques, plasma ashing techniques, thermal treatments (e.g., rapid thermal anneal, furnace anneals, thermal oxidation, and/or another thermal treatment), chemical vapor deposition (CVD), atomic layer deposition (ALD), physical vapor deposition (PVD), molecular beam epitaxy (MBE), electrochemical deposition (ECD), chemical-mechanical planarization (CMP), backgrinding techniques, and/or another technique for fabricating an integrated circuit.

Although the cross-sectional diagrams depicted in FIGS. 1-5B are two-dimensional, it is understood that the diagrams depicted in FIGS. 1-5B represent three-dimensional structures.

Figure 1:
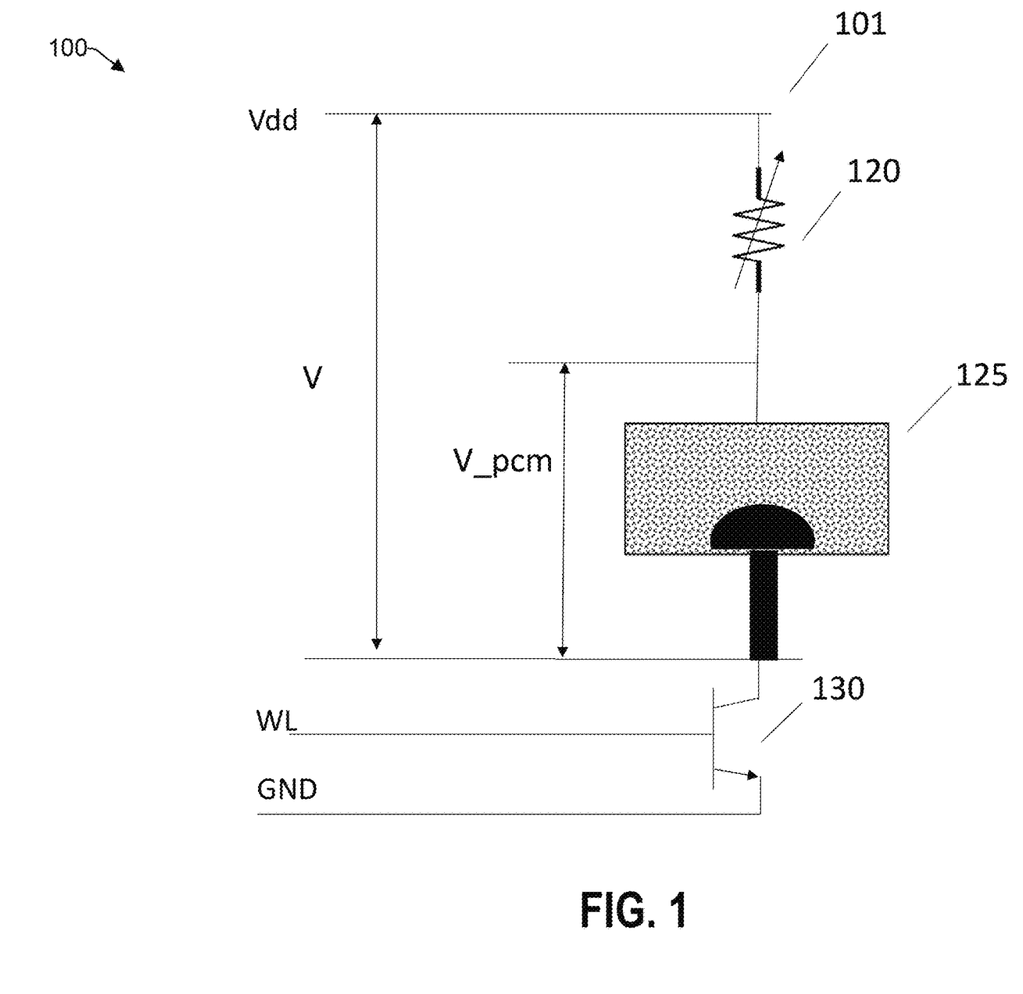
FIG. 1 depicts a cross-sectional view of an electrical device, consistent with an illustrative embodiment.

FIG. 1 shows a circuit overview 100 of an electrical device 101, e.g., a device that is a memory cell that includes phase change memory 125, consistent with an illustrative embodiment.

In various embodiments, different suitable phase change memory 125 can be used in series with a variable element 120, where the variable element can be any suitable electrical element for adjusting or controlling voltage or current, e.g., a variable resistor 120, tunnel resistor 120 or tunneling diode 120. It is noted that the overview or circuit schematic of FIG. 1 symbolizes element 120 as a variable resistor, but as stated and implied, any suitable other element for adjusting current and/or voltage can be used, including but not limited to a tunneling diode. In one or more embodiments, the variable resistor 120 can be an RRAM device and fabricated as such. Any suitable transistor device 130 can be placed in series with the PCM 125. As shown, and pursuant to one or embodiments, the transistor device 130 is a complementary metal oxide semiconductor (CMOS) transistor device whose gate structure is connected to any suitable read or write source, e.g., "WL," and whose source and/or drain is connected to ground (GND). In one or more other embodiments (not shown), any suitable other transistor device or other device can be included in device 101, including those that can represent a state by a threshold current or voltage.

In one or more embodiments, a voltage source, e.g., Vdd, is applied to device 101, where the variable element 120 can adjust, e.g., lower, the voltage "V_pcm" associated with the PCM 125. As stated and implied herein, the inclusion of the variable element 125 can i) increase and stabilize the SET resistance, e.g., making it constant, associated with the device 101, ii) enhance flexibility in adjusting the programmable voltage (e.g., V_pcm) and associated current, e.g., reducing the former and increasing the latter, in relation to the device 101, iii) reduce leakage paths associated with the device 101 and/or iv) improve overall device 101 endurance and prevent device degradation.

Figure 2:
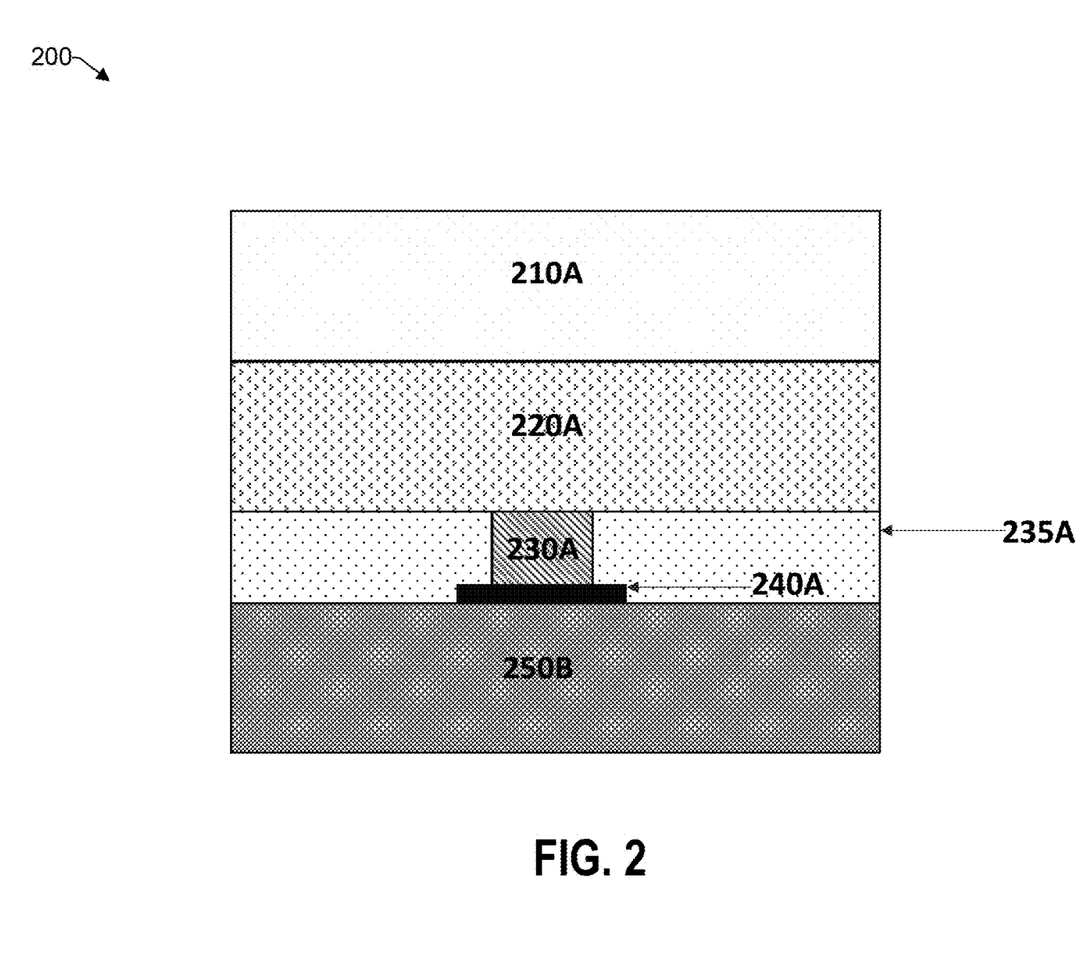
FIG. 2 depicts cross-sectional view of an electrical device, consistent with an illustrative embodiment.

FIG. 2 illustrates an electrical device 200, e.g., a memory cell 200, consistent with at least one or more embodiments of the present disclosure. In or more embodiments, the electrical device 200 can include an insulating material or layer 235A. The insulating material or layer 235A can be composed of any suitable insulating material, including but not limited to nitride, silicon nitride, silicon dioxide, SiON, SiC, SiOCN, or SiBCN. The insulating material or layer 235A can define a sub-lithographic aperture or opening for positioning an electrode 230A, where the electrode 230A can be considered a first electrode 230A, heater 230A, and/or bottom electrode 230A. In one or embodiments, an oxide layer 240A (at least one oxide layer 240A) is formed in direct contact with the electrode 230A. In one or more embodiments, the aperture's size can be determined based on the desired size of the electrode 230A.

In one or more embodiments, the electrode 230A can include one or more of any suitable metal or material, including but not limited to: polycrystalline or amorphous silicon, germanium, silicon germanium, a metal (e.g., tungsten, titanium, tantalum, ruthenium, zirconium, cobalt, copper, aluminum, lead, platinum, tin, silver, gold), a conducting metallic compound material (e.g., tantalum nitride, titanium nitride, tungsten silicide, tungsten nitride, ruthenium oxide, cobalt silicide, nickel silicide), carbon nanotube, conductive carbon, or any suitable combination of these materials.

In one or more embodiments, the electrode 230A can include or be entirely composed of a metal material, including those described herein, and as such, can be an entirely metallic layer of device 200. In one or more embodiments, electrode 230A is composed of conductive non-phase change material. As used herein, the term "conductive non-phase change material" is a conductive material that is not configured to be programmable to different resistive states with application of heat, and where the conductive non-phase change material may be, for example, titanium nitride (TiN), tungsten (W), tantalum nitride (TaN) or any other suitable material.

In one or more embodiments, one or more etching (dry or wet), planarization and oxidization processes can be applied in relation to the insulating material 235A and the PCM 220A (described in greater below), where the etching, in or more embodiments, can be reactive-ion etching (RIE) in order to achieve the geometry as shown in FIG. 2 and to achieve the desired dimensions in relation to insulating material or layer 235A. As shown, and pursuant to one or more embodiments, the oxide layer 240A is a confined layer in relation to the electrode 230A, e.g., bottom electrode 230A.

In one or more embodiments, the oxide layer 240A can be made of partially or all of any suitable oxide material, including but not limited to, metal oxides such as hafnium oxide, hafnium silicon oxide, hafnium silicon oxynitride, lanthanum oxide, lanthanum aluminum oxide, zirconium oxide, zirconium silicon oxide, zirconium silicon oxynitride, titanium oxide, barium strontium titanium oxide, barium titanium oxide, strontium titanium oxide, yttrium oxide, aluminum oxide, lead scandium tantalum oxide, and lead zinc niobate. The high-k material can further include dopants such as lanthanum, aluminum, etc. In one or more embodiments, the oxide layer 240A can be made of all of or partially of i) tantalum oxide (TaO2) or ii) tungsten-oxide (WO3).

In one or more embodiments, the oxide layer 240A can have a width greater than the electrode 230A, with a thickness of 3 nm-5 nm, and with a width of 10 nm-50 nm. In one or more embodiments of the present disclosure, a thickness of 3 n-5 nm for the oxide layer offers a significant advantage in that it is thin enough to be tunneled through by carriers (electrons or holes) with bias voltages in the 0.5V-3V range during a write operation, while also avoiding leakages with smaller bias voltages during write, e.g. approximate 0.2V or less. In one or more embodiments, the width of the electrode 230A can be 10 nm-30 nm, where in one or more embodiments of the present disclosure, this range offers a balance between power consumption during switching, without being too small to cause reliability and uniformity issues in general. In one or more embodiments, the width of the electrode 210A (described in greater detail below), the PCM 220A (described in greater detail below), the electrode 230A, and the metal interconnect layer 250B (described in greater detail below) are between 100 nm-200 nm. In one or more embodiments, the width of the electrode 210A (described in greater detail below), the PCM 220A (described in greater detail below), the electrode 230A, and the metal interconnect layer 250B (described in greater detail below) are approximately 200 nm, the width of the oxide layer 240A is greater than 30 nm and the thickness is approximately 5 nm, and the width of the bottom electrode 230A is approximately 30 nm.

In one or more embodiments, the device 200 includes a phase change memory (PCM) 220A composed of any suitable phase change material. By way of non-limiting example, the phase change material of the PCM can be Ge2Sb2Te5 (GST), SbTe, and In2Se3, and can be configured to be programmable to an amorphous (high resistance) state or a crystalline (low resistance) state with application of heat.

In one or more embodiments, the device 200 further includes an electrode 210A, where the electrode 210A can be a second electrode 210A or a top electrode 210A. (As implied herein, electrode 210 can be considered the first electrode and electrode 230A can be considered the second electrode and vice versa). The material composition of the electrode 210A can be as described with respect to the material composition described with reference to electrode 230A, where the material composition of electrode 230A can be the same or different than that of electrode 210A, and where the dimensions of electrode 210A and 230A can be different.

In one or more embodiments, the device 200 can include a layer 250A that is or includes one or more metal interconnects that connect to other layers or devices (e.g., not shown), such as substrates (e.g., silicon substrates), other conducting layers or electrodes (e.g., metal vias), including metal buried in one or more insulator or dielectric layers, or any other suitable layer or material dependent on a particular application. In one or more embodiments, the layer 250A can be considered a third electrode layer or metallic layer that is composed of any suitable conducting material described herein.

In one or more embodiments, with respect to device 200, the top electrode 210A is in series with the PCM 220A in further series with bottom electrode 230A, where 230A is included in insulator layer 235A, in further series with respect to oxide layer 235A, e.g., at least one oxide layer 235 composed of tantalum-oxide and/or tungsten-oxide, and in series with layer 250A which includes one or more metal interconnects.

In one or more embodiments, the PCM 220A is directly connected to, directly in contact with, and/or directly coupled to the bottom electrode 230A, and the bottom electrode 230A is directly connected to, directly in contact with, and/or directly coupled to the at least one oxide layer 240A. The at least one oxide layer 240A is directly connected to, directly in contact with, and/or directly coupled to at least one metal interconnect associated with layer 250A. In one or more embodiments, the PCM layer 220A is in direct contact, directly coupled to, and/or directly connected to top electrode 210, whereas all other layers are not directly in contact thereto.

In one or more embodiments, the at least one oxide layer 240A as oriented in device 200 serves to create an overall tunneling element, e.g., a tunneling diode, in the device 200 that can control the programmable voltage associated with the PCM 220A, improve device endurance and stabilize the SET resistance associated with device 200.

Figure 3:
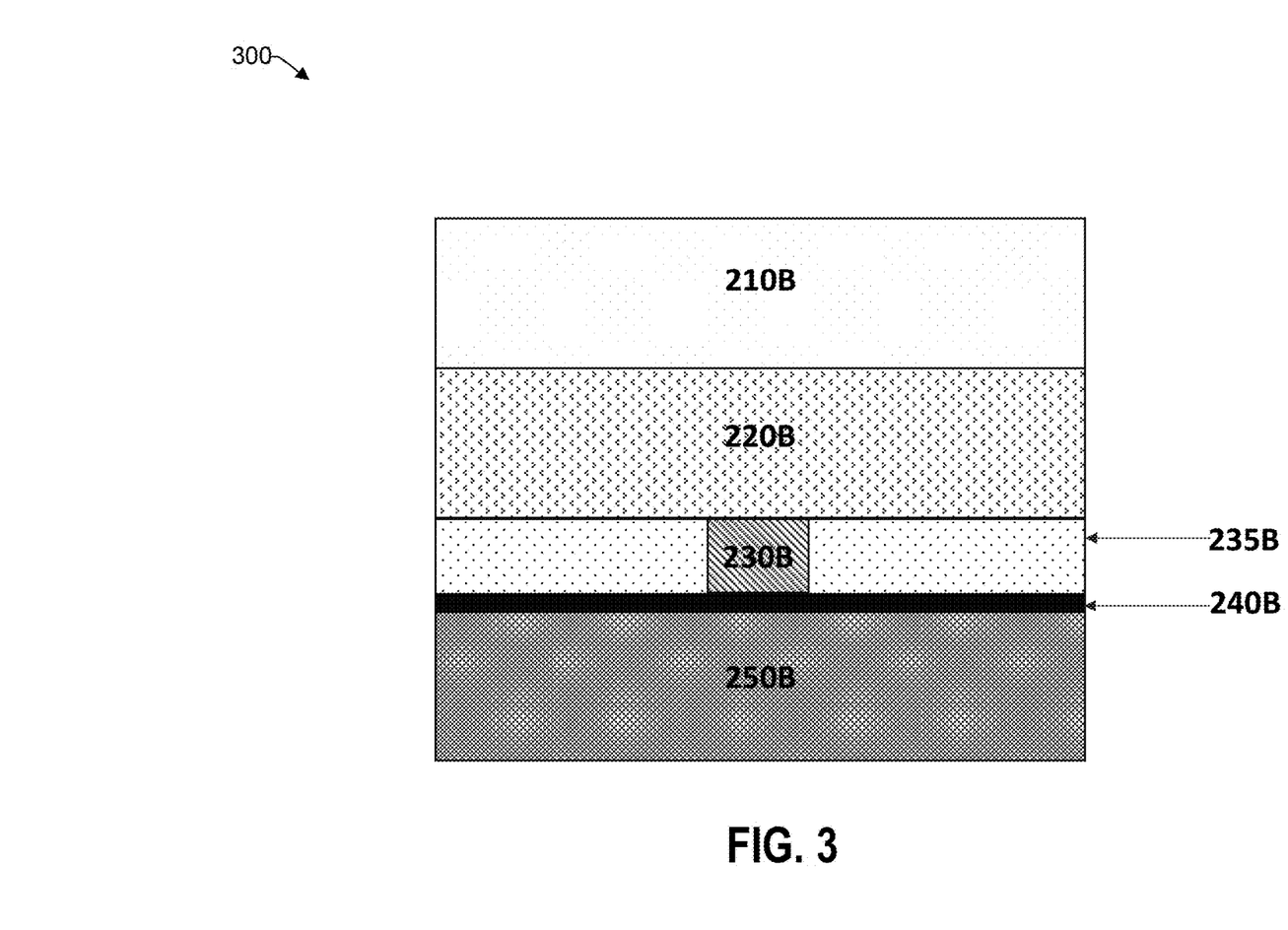
FIG. 3 depicts a cross-sectional view of an electrical device, consistent with an illustrative embodiment.

FIG. 3 illustrates an electrical device 300, e.g., a memory cell 300, consistent with one or more embodiments of the present disclosure. The electrical device 300 can include an electrode 210B, e.g., a second and/or top electrode, a PCM 220B, an electrode 230B, e.g., a bottom or first electrode 230B, at least one oxide layer 240B, and a layer 250B with one or more metal interconnects contained or associated therewith.

Layers or elements 210B, 220B, 230B, 235B 240B and 250B can be as described with the various embodiments in relation to FIG. 2 and device 200, except, in an alternative embodiment to at least one or more embodiments associated with FIG. 2, the at least one oxide layer can be a blanket layer 240B relative to layer 250B and the bottom electrode 230B. The material composition and manner of forming the at least one oxide layer 240B can be as with respect to the at least oxide layer 240A, where the manner of forming the at least one oxide layer 240B can be any suitable technique that includes at least one of oxidation, etching (e.g., wet or dry), blanket or conformal deposition in relation to layer with one or more metal interconnects 250B, and/or any other suitable technique as described herein or otherwise.

Although shown as being deposited over or in contact with layer 250B, in alternate embodiments, the at least one oxide layer 240B can be buried or contained in layer with one or more metal interconnects 250B, e.g., using a suitable technique or combination of techniques, such as oxidation, etching and/or deposition techniques. In one or more embodiments, layers or elements 210B, 220B, 230B, 235B, 240B, and 250B are approximately 200 nm in width, where the at least one oxide layer 240B is approximately 5 nm in thickness, and where the bottom electrode 230B is approximately 30 nm in width. In one or more embodiments, configuration with a larger PCM 220B in relation to bottom electrode 240B is a mushroom configuration. In one or more embodiments of the present disclosure, a mushroom configuration, such as, for example, when PCM 220B has a width of approximately 200 nm, and bottom electrode 230B has a width less than 30 nm, offers a patterning advantage during formation in relation to the PCM 220B, while also offering an advantage of reduced power consumption in relation to the bottom electrode 230B; and in one or more embodiments, these advantages can be compounded when the at least one oxide layer 240B is thin, e.g. less than or equal to 5 nm, which permits high current at high voltage and high resistance at low voltage.

In one or more embodiments, as shown, the at least one oxide layer 240B as oriented in device 300 serves to create and overall tunneling element, e.g., a tunneling diode, in the device 300 that can control the programmable voltage associated with the PCM 220B, improve device endurance and stabilize the SET resistance associated with device 300.

Figure 4:
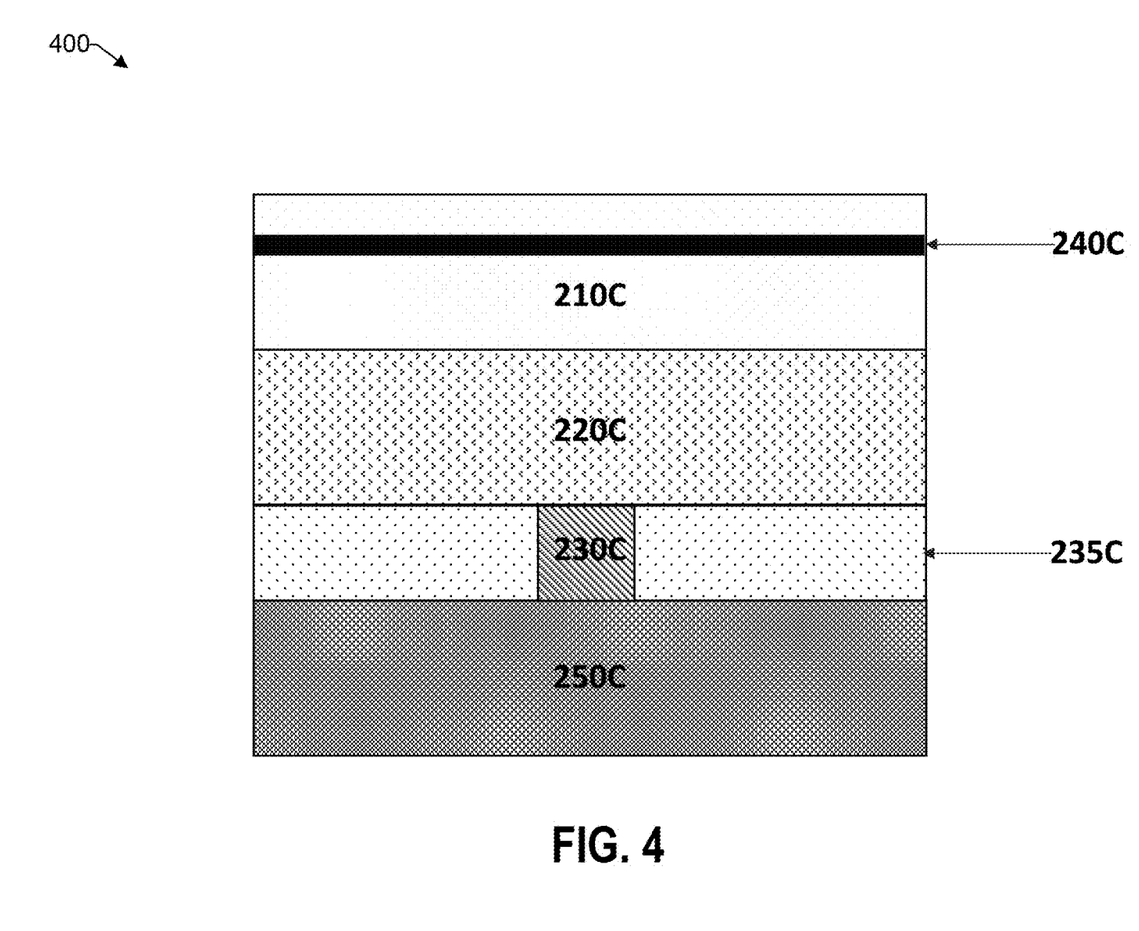
FIG. 4 depicts a cross-sectional view of an electrical device, consistent with an illustrative embodiment.

FIG. 4 illustrates an electrical device 400, e.g., a memory cell 400, consistent with an illustrative embodiment. The electrical device 400 can include an electrode 210C, e.g., a second and/or top electrode, a PCM 220C, an electrode 230C, e.g., a bottom or first electrode 230C, an insulator layer 235C, at least one oxide layer 240C, and a layer 250C with one or more metal interconnects included or associated therewith. Layers or elements 210C, 220C, 230C, 240C, and 250C can be as described with the various embodiments in relation to FIG. 2 and device 200 or device 300 of FIG. 3, except, in an alternative embodiment associated with FIG. 2 and FIG. 3, the at least one oxide layer 240C can be a buried layer 240C associated with the top electrode 210C. The buried layer 240C could be formed in the top electrode 210C using any one or combination of etching, oxidation, and deposition technique as described herein or otherwise suitable. According to these one or more alternate embodiments, the at least one oxide layer 240C remains in series with the rest of the elements or layers associated with device 400, but it is not in direct contact with either the one or more interconnect layer 250C, nor in direct contact with the bottom electrode 230C. In one or more embodiments, layers or elements 210C, 220C, 230C, 235C, 240C, and 250C are approximately 200 nm in width, where the at least one oxide layer 240B is approximately 5 nm in thickness, and where the bottom electrode 230B is approximately 30 nm in width.

In one or more embodiments, the at least one oxide layer 240C as oriented in device 400 is configured to create an overall tunneling element, e.g., a tunneling diode, in the device 400 that can control the programmable voltage associated with the PCM 220C, improve device endurance and stabilize the SET resistance associated with device 400.

Figure 5A:
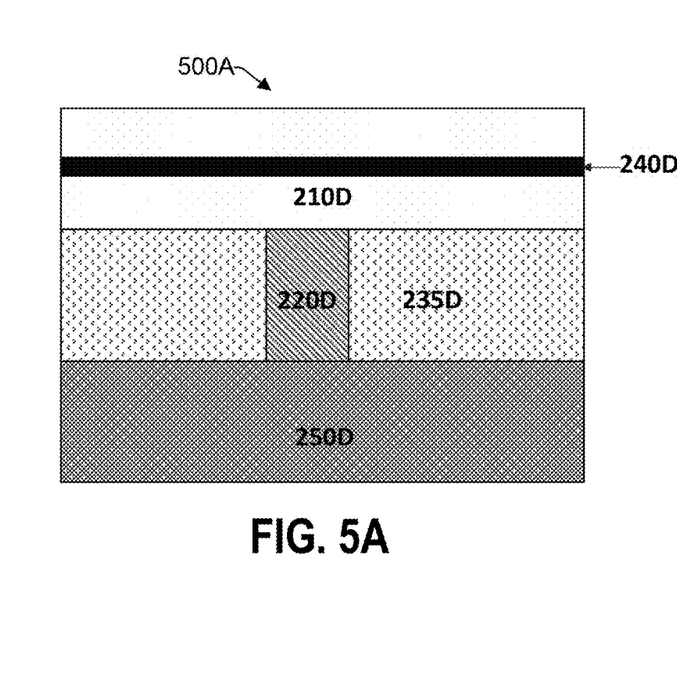
FIG. 5A depicts a cross-sectional view of an electrical device, consistent with an illustrative embodiment.

FIG. 5A illustrates an electrical device 500A, e.g., a memory cell 500A, according to one or more embodiments. In one or more embodiments, the electrical device 500A includes an electrode 210D, e.g., a first or top electrode, a PCM 220D, at least one oxide layer 240D, and a layer 250D with one or more metal interconnects included or associated therewith. Layers or elements 210D, 220D, 230D, 235D, 240D, and 250D can be as described with the various embodiments in relation to FIG. 2 and device 200, device 300 of FIG. 3, and device 400 of FIG. 4, except, in an alternative embodiment associated with FIG. 2, FIG. 3, and FIG. 4, there is no bottom electrode in contact with the layer with one or more metal interconnects 250D (and any associated interconnects associated therewith) and the PCM 220D directly contacts, is directly coupled to, and/or is directly connected to the top electrode 210D and the layer 250D with one or more interconnects.

In one or more embodiments, the PCM 220D can be formed in sub-lithographic aperture or opening in lieu of an electrode, e.g., a bottom electrode 230A, as described with respect to FIG. 2. According to these one or more alternate embodiments, the PCM 220D is included in the insulator layer 235D and is in series with the rest of the elements or layers associated with device 500A, but there is no intermediary layer between the PCM 220D and the layer with one or more metal interconnects 250D. In one or more embodiments of the present disclosure, the at least one oxide layer 240D is a buried layer in relation to the top electrode 210A, with any suitable etching, oxidation, and/or deposition technique being useful for forming the at least one oxide layer 240D therein.

In one or more embodiments, layers or elements 210D, 220D, 235D, 240D, and 250D are approximately 200 nm in width and the at least one oxide layer 240D can be approximately 3 nm-5 nm in thickness.

In one or more embodiments, the at least one oxide layer 240D as oriented in device 500A serves to create and overall tunneling element, e.g., a tunneling diode, in the device 500A that can control the programmable voltage associated with the PCM 220D, improve device endurance and stabilize the SET resistance associated with device 500A, while also reducing the number of conductive layers to operate the device 500A.

Figure 5B:
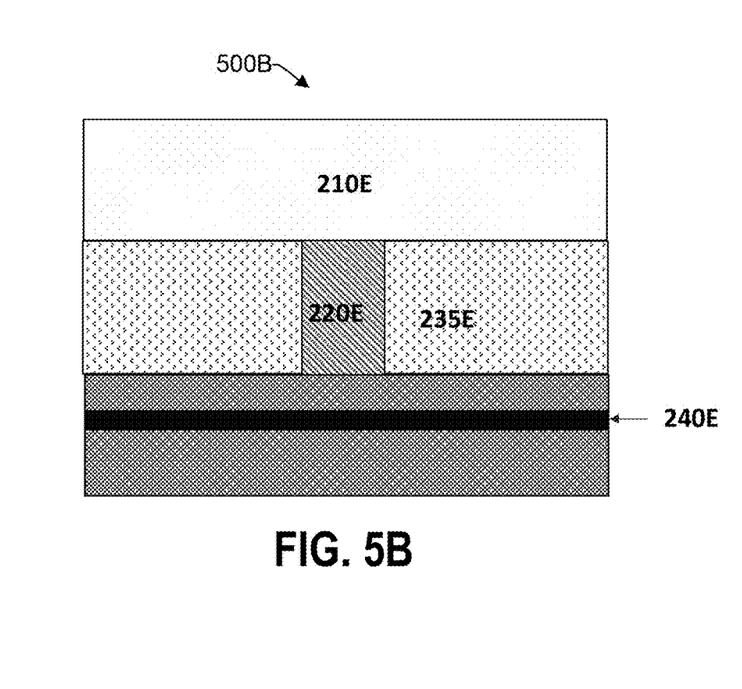
FIG. 5B depicts a cross-sectional view of an electrical device, consistent with an illustrative embodiment.

FIG. 5B illustrates an electrical device 500B, e.g., a memory cell 500B, according to one or more embodiments. In one or more embodiments, the electrical device 500A can include an electrode 210E, e.g., a first or top electrode, a PCM 220E, at least one oxide layer 240E, and a layer 250E with one or more metal interconnects contained or associated therewith. Layers or elements 210E, 220E, 235E. 240E, and layer 250E can be as described with the various embodiments in relation to FIG. 5A, except, in an alternative embodiment or embodiments to at least on embodiment associated with FIG. 5A and device 500A, the at least oxide layer 240B of device 500B is a buried layer of layer 250E, e.g., the layer 250E with one or more interconnects, where the inclusion therein can be pursuant to any suitable technique described herein or as otherwise suitable. In one or embodiment, layers or elements 210E, 220E, 235E, 240E, and 250E are approximately 200 nm in width. The at least one oxide layer 240E is approximately 3 nm-5 nm in thickness.

In one or more embodiments, the at least one oxide layer 240E as oriented in device 500B serves to create and overall tunneling element, e.g., a tunneling diode, in the device 500B that can control the programmable voltage associated with the PCM 220E, improve device endurance and stabilize the SET resistance associated with device 500B, while also reducing the number of conductive layers to operate the device 500B.

Figure 6:
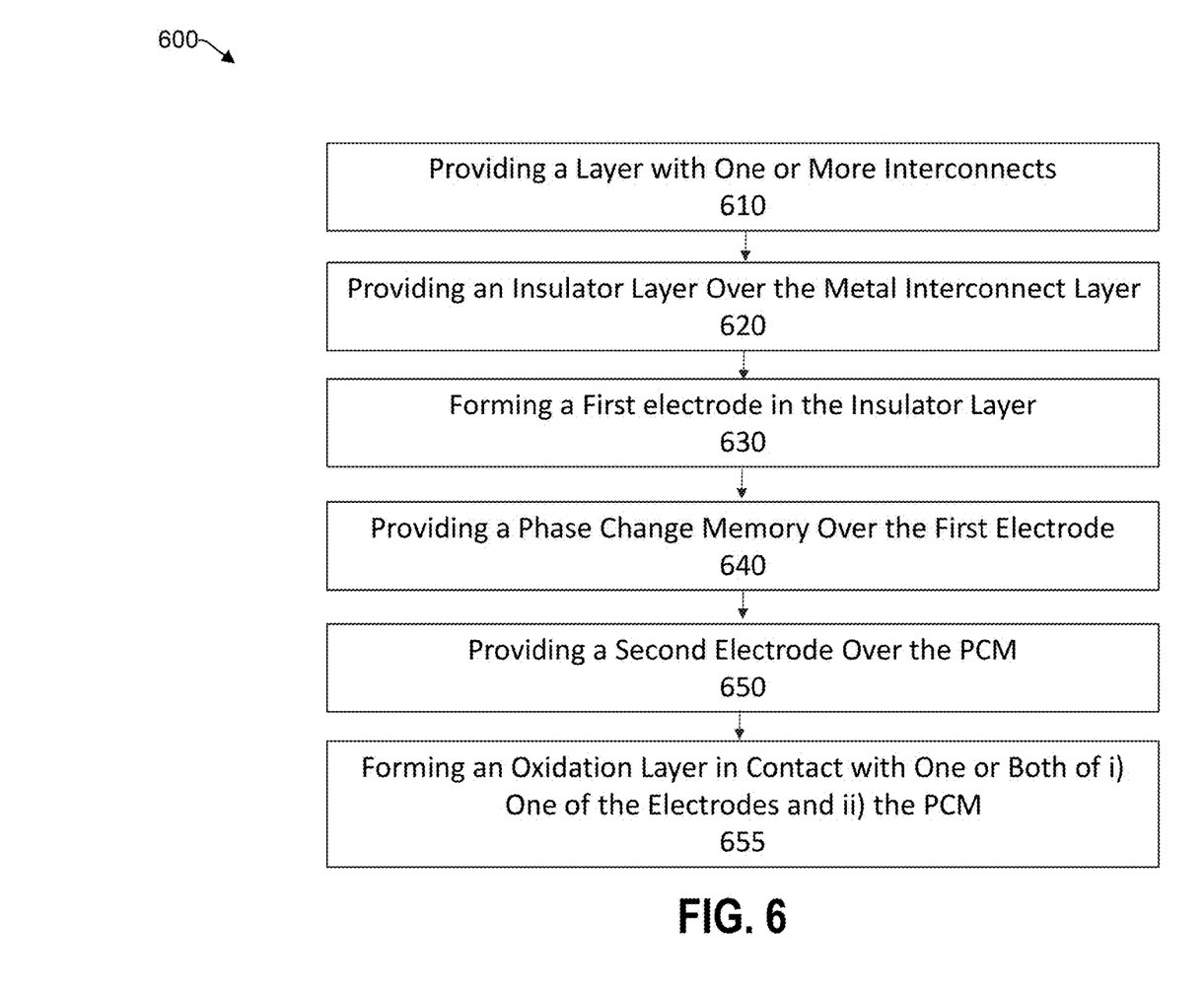
FIG. 6 depicts am illustrative flow for fabricating or making one or more devices in accordance with the present disclosure.

FIG. 6 illustrates a flow 600 for forming one or more electrical devices and/or circuit connections in accordance with an illustrative embodiment. For example, the formed device can be a memory cell. Although a particular sequence is shown with respect to FIG. 6, it is understood that the various operations can be performed in different order as necessary to achieve a particular objective, e.g., operation 655 can be performed before or after operations 640 and 650 depending on the desired objective and/or structural geometry.

As shown with respect to flow operation 610, and pursuant to one or more embodiments, including with reference to structures disclosed above, a layer with one or more metal interconnects, e.g., layer 250A, 250B, 250C, 250D, or 250E, is provided. In one or more embodiments, the layer with one or more metal interconnects can be one metal interconnect or a plurality of metal interconnects for connecting the to be formed electrical device to other components of an overall device, other devices, and/or other layers of the same device. In one or more embodiments, the layer with the one or more metal interconnects can be connected to one or more of i) one or more substrates (e.g., silicon based), ii) other metal contacts and components, iii) one or more transistors and/or layers associated therewith, iv) one or more dielectric or insulating layers, or v) any other suitable electrical component or components.

In one or more embodiments, the flow 600 includes operation 620, which includes providing one or more insulator layers, e.g., layer 235A, 235B, 235C, 235D, or 235E, with respect to the to be formed device. In one or more embodiments, the one or more insulating layers can be composed entirely or partially of any suitable insulating material as described herein or otherwise suitable and formed or deposited using any suitable semiconductor technique as described herein or as otherwise suitable.

In one or more embodiments, and pursuant to flow operation 630, one or more electrical elements can be formed in the insulator layer, where the one or more electrical elements can include one or more electrodes, e.g., bottom electrode 230A, 230B, or 230C. In one or more embodiments, using one or more suitable lithographic, etching (e.g., RIE), planarization and/or deposition techniques (e.g., CVD), an opening is formed in the insulator layer and the relevant material associated with the electrical element can be deposited therein, e.g., where the electrode can be any suitable conducting material such as a metal.

In one or more embodiments and pursuant to flow operation 640, a phase change memory (PCM) can be provided or formed in relation to (e.g. over or within) a suitable layer, e.g., a top electrode and/or insulating layer, e.g., as shown with respect to PCM 220A, 220B, and 220C, where any suitable deposition, bonding, etching, planarization technique, any other suitable technique or any combination thereof can be used to form or provide the PCM in or over the desired layer. In various other embodiments, operation 630 can omit forming a bottom electrode, and the PCM can be formed in the insulator layer, e.g., as shown with respect to FIG. 5A and FIG. 5B (e.g., PCM 220D and 220E), where any suitable operation or operations as discussed herein can be used to accomplish the formation therein, and where the material used would be any suitable PCM material as discussed herein or otherwise suitable.

In one or more embodiments, pursuant to operation 650, a second electrode or top electrode, e.g., as shown with respect to 210A, 210B, 210C, 210D, and 210E, is provided with respect to PCM, e.g., on top of the PCM, where the PCM can be in direct contact with both the top and bottom electrode, e.g., as shown in FIGS. 1-4, or the PCM can be in direct contact with the top electrode and the layer with the one or more interconnects, e.g., as shown with respect to FIGS. 5A-5B. Any suitable operation, e.g., deposition, can be used to form and/or provide the second or top electrode with respect to the flow 600.

In one or more embodiments, pursuant to operation 655, at least one oxidation layer, e.g., as shown with respect to 240A, 240B, 240C, 240D, and 240E, can be formed with respect to flow 600. In one or more embodiments, the at least one oxidation layer is in contact with i) at least one of the electrodes associated with the flow 600 and/or ii) the PCM associated with the flow 600. The at least one oxidation layer can be formed using any suitable combination and sequencing of etching and oxidation, including where the desired thickness of the at least one oxidation layer is between 3 nm-5 nm.

In one or more embodiments, the at least one oxidation layer can be composed of tantalum-oxide and/or tungsten-oxide. The at least one oxide layer can be a blanket layer, e.g., as shown with respect to 240B or a confined layer, e.g., as shown with respect to 240A. In one or more embodiments, all the PCM, electrodes, and oxide layer, irrespective of whether there is a direct contacting amongst all of the elements, are in series, and the oxide layer forms a variable element, e.g., tunneling diode, with respect to the device associated with flow 600, such that the device endurance is increased, increased control of SET resistances is possible, and greater control of the programmable voltage associated with the PCM is possible.

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An electrical device, comprising:
   a first electrode in series with a second electrode;
   a phase change memory (PCM) in series with the second electrode; and
   a variable electrical element in series with the PCM,
   wherein the variable electrical element includes at least one oxide layer, and wherein the first electrode is a bottom electrode in direct contact with the at least one oxide layer and is in direct contact with the PCM.

2. The electrical device of claim 1, wherein the variable electrical element is i) a variable resistor or ii) a tunneling diode.

3. The electrical device of claim 1, wherein the at least one oxide layer comprises at least one of i) tantalum-oxide or ii) tungsten-oxide.

4. The electrical device of claim 1, further comprising: at least one transistor in series with the PCM.

5. The electrical device according to claim 1, further comprising:
   one or more metal interconnects in direct contact with the at least one oxide layer.

6. The electrical device according to claim 5, wherein the at least one oxide layer is a confined layer of the bottom electrode.

7. The electrical device according to claim 5, wherein the at least one oxide layer is a blanket layer associated with the bottom electrode.

8. The electrical device according to claim 1, wherein the first electrode is a top electrode, and wherein the at least one oxide layer is associated with the top electrode.

9. The electrical device according to claim 8, wherein the second electrode is a bottom electrode with at least one intermediary layer in between the bottom electrode and the at least one oxide layer.

10. The electrical device according to claim 9, further comprising: one or more metal interconnects in direct contact with the bottom electrode.

11. The electrical device of claim 10, wherein the bottom electrode is in direct contact with the PCM.

12. An electrical device, comprising:
    a phase change memory (PCM) in direct contact with both a first electrode and a layer with one or more metal interconnects; and
    a variable electrical element in direct contact with the PCM and in series with the PCM and comprising at least one oxide layer,
    wherein the first electrode is a bottom electrode in direct contact with the at least one oxide layer, and wherein the first electrode is in direct contact with the PCM.

13. The electrical device of claim 12, further comprising: at least one transistor in series with the PCM, wherein:
    the variable electrical element is i) a variable resistor or ii) a tunneling diode; and
    the variable element includes at least one oxide layer.

14. The electrical device of claim 13, wherein the at least one oxide layer includes at least one of i) tantalum-oxide or ii) tungsten-oxide.

15. The electrical device of claim 14, wherein the at least one oxide layer is included in the layer with one or more metal interconnects.

16. The electrical device according to claim 14, wherein the at least one oxide layer is included in the first electrode.

17. A method for forming an electrical device, the method comprising:
    providing a layer with one or more metal interconnects;
    providing an insulator layer over the layer with the one or more metal interconnects;
    forming a first electrode in the insulator layer and in direct contact with at least one metal interconnect of the layer with the one or more metal interconnects;

providing a phase change memory (PCM) over the first electrode and in direct contact with the first electrode;

providing a second electrode over the PCM and in direct contact with the PCM; and providing a variable electrical element in series with the PCM, the variable electrical element having at least one oxide layer in direct contact with the first electrode, wherein the PCM and the at least one oxide layer are in series.

18. The method according to claim 17, wherein the at least one oxide layer is formed by performing i) etching or ii) oxidation operations in relation to the device, and wherein the at least one oxide layer is between 3 nm and 5 nm in thickness.

* * * * *